(12) United States Patent
Desouky et al.

(10) Patent No.: US 11,492,494 B2
(45) Date of Patent: Nov. 8, 2022

(54) ROCK HARDNESS FOR HYDRAULIC FRACTURING AND ART PRESERVATION

(71) Applicant: King Fahd University of Petroleum and Minerals, Dhahran (SA)

(72) Inventors: Mahmoud Desouky, Dhahran (SA); Murtada Al Jawad, Dhahran (SA); Theis Ivan Solling, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 304 days.

(21) Appl. No.: 16/828,391

(22) Filed: Mar. 24, 2020

(65) Prior Publication Data

US 2021/0301140 A1    Sep. 30, 2021

(51) Int. Cl.
| | |
|---|---|
| C09C 1/02 | (2006.01) |
| C09C 1/62 | (2006.01) |
| C01F 11/18 | (2006.01) |
| C09K 8/80 | (2006.01) |
| C09K 8/86 | (2006.01) |
| C09K 8/58 | (2006.01) |

(52) U.S. Cl.
CPC ............... *C09C 1/021* (2013.01); *C09K 8/58* (2013.01); *C09K 8/80* (2013.01); *C09K 8/86* (2013.01); *C01F 11/181* (2013.01); *C01P 2004/24* (2013.01); *C01P 2004/61* (2013.01); *C09C 1/625* (2013.01)

(58) Field of Classification Search
None
See application file for complete search history.

(56) References Cited

U.S. PATENT DOCUMENTS

| | | | |
|---|---|---|---|
| 4,630,678 A * | 12/1986 | Mumallah | E21B 43/261 166/400 |
| 10,066,152 B2 | 9/2018 | Lu et al. | |
| 10,906,001 B2 * | 2/2021 | Chen | B01D 61/58 |
| 11,365,345 B2 * | 6/2022 | Al-Jawad | C09K 8/94 |
| 2011/0315383 A1 * | 12/2011 | Li | C09K 8/703 166/300 |
| 2011/0315384 A1 * | 12/2011 | Miquilena | C09K 8/92 166/305.1 |
| 2017/0088431 A1 | 3/2017 | Shahsavari et al. | |

(Continued)

FOREIGN PATENT DOCUMENTS

CN     109956759 A     7/2019

OTHER PUBLICATIONS

Briffa, et al. ; The behaviour of as-applied and artificially weathered silica-epoxy consolidants on a typical Mediterranean porous limestone: a comparison with TEOS ; Heritage Science 7:30 ; May 13, 2019 ; 30 Pages.

(Continued)

*Primary Examiner* — John J Figueroa
(74) *Attorney, Agent, or Firm* — Oblon, McClelland, Maier & Neustadt, L.L.P.

(57) ABSTRACT

A method of increasing the strength of a carbonate rock is described. The carbonate rock may be located within a subterranean carbonate formation or may be located on a building exterior. The method involves contacting the carbonate rock with a composition comprising a zinc salt or a silicon alkoxide. This may increase the hardness of the carbonate rock by 10% or more.

14 Claims, 6 Drawing Sheets

(56) References Cited

U.S. PATENT DOCUMENTS

2018/0118621 A1    5/2018  Wang et al.

OTHER PUBLICATIONS

Ksinopoulou, et al. ; Consolidation effectiveness of modified Si-based nanocomposites applied to limestones ; Materials and Structures 51:156 ; Nov. 15, 2018 ; Abstract Only ; 1 Page.
Coltelli, et al. ; Preparation of Water Suspensions of Nanocalcite for Cultural Heritage Applications ; MDPI nanomaterials 8, 254; Apr. 19, 2018; 20 Pages.
Pinto, et al. ; Consolidation of carbonate stones: Influence of treatment procedures on the strengthening action of consolidants ; Journal of Cultural Heritage 13 ; pp. 154-166 ; Sep. 19, 2011 ; 13 Pages.

* cited by examiner

| 2.5 in | Before | After |
|---|---|---|
| Ca |  |  |
| Zn |  |  |
| Na |  |  |
| Cl |  |  |
| S |  |  |

ROCK HARDNESS FOR HYDRAULIC FRACTURING AND ART PRESERVATION

BACKGROUND OF THE INVENTION

Technical Field

The present invention relates to a method of increasing the hardness of carbonate rock by treatment with a zinc salt or a silicon alkoxide.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Improving carbonate rock strength is important to many applications. The need for improving rock strength becomes more important when the rock is weakened through natural or artificial processes. In hydraulic fracturing applications, maintaining fracture conductivity is essential to sustained long term well productivity. Undesirable proppant embedment in weak rock is a serious issue that can reduce fracture conductivity and well productivity. This usually occurs when the rock is soft. The issue is more serious when acid is used without a proppant to prop the fracture open. Acid is known to weaken carbonate rocks, resulting in sharp declines in fracture conductivity. Hence, method for improving rock hardness can result in maintaining high fracture conductivity for longer times, thus increasing well productivity.

Many historic buildings in Europe are made of stones of carbonate rock. Preserving these stones is very important to preserving the history and culture of the region. This can be done by improving the strength of rock after it has been exposed to natural weathering.

In view of the foregoing, one objective of the present invention is to strengthen carbonate rock by application of a composition of a silicon alkoxide or a zinc salt.

BRIEF SUMMARY OF THE INVENTION

According to a first aspect, the present disclosure relates to a method for treating a carbonate rock. The method involves the step of contacting the carbonate rock with an aqueous composition comprising a zinc salt, thus forming a treated rock having a hardness determined by Young's modulus that is at least 10% greater than the carbonate rock.

In one embodiment, the aqueous composition comprises 0.01-1.0 M zinc salt.

In one embodiment, the carbonate rock is part of a building exterior or part of an outdoor ornamental structure.

In one embodiment, the carbonate rock is within a subterranean carbonate formation.

In one embodiment, the hardness of the treated rock is 20-80% greater than the carbonate rock.

In one embodiment, the zinc salt is at least one selected from the group consisting of $ZnCl_2$, $ZnBr_2$, $ZnI_2$, $ZnF_2$, $ZnCl_2$, $ZnO$, $ZnS$, $ZnSO_4$, $ZnSe$, $Zn(OH)_2$, $Zn(NO_3)_2$, and $Zn_3(PO_4)_2$.

In one embodiment, the zinc salt is at least one selected from the group consisting of $ZnSO_4$, $Zn(OH)_2$, and $Zn_3(PO_4)_2$.

In one embodiment, the zinc salt is $ZnSO_4$.

In one embodiment, the aqueous composition consists of the zinc salt and water.

In a further embodiment, where the aqueous composition consists of the zinc salt and water, the concentration of the zinc salt is 0.30-0.60 M.

In one embodiment, the contacting is maintained for a time period of 12-72 h.

In one embodiment, the composition further comprises a carbonate or a bicarbonate salt.

In one embodiment, the carbonate rock comprises at least 85 wt % calcium carbonate relative to a total weight of the carbonate rock.

In one embodiment, the treated rock comprises $ZnCO_3$.

In one embodiment, the treated rock comprises nanoplatelets.

In one embodiment, the treated rock has a permeability that is decreased by 40-80% relative to a permeability of the carbonate rock.

According to a second aspect, the present disclosure relates to a method for treating a subterranean carbonate formation. The method comprises contacting a carbonate rock within the formation with a composition comprising a silicon alkoxide, thus forming a treated rock having a hardness that is at least 10% greater than the carbonate rock.

In one embodiment, the silicon alkoxide is tetraethyl orthosilicate.

In one embodiment, the contacting is maintained for a time period of 12-72 h.

In one embodiment, the composition comprises the silicon alkoxide at a concentration in a range of 7.5-100 wt %, relative to a total weight of the composition.

In one embodiment, the composition further comprises a proppant.

In one embodiment, the composition further comprises water.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
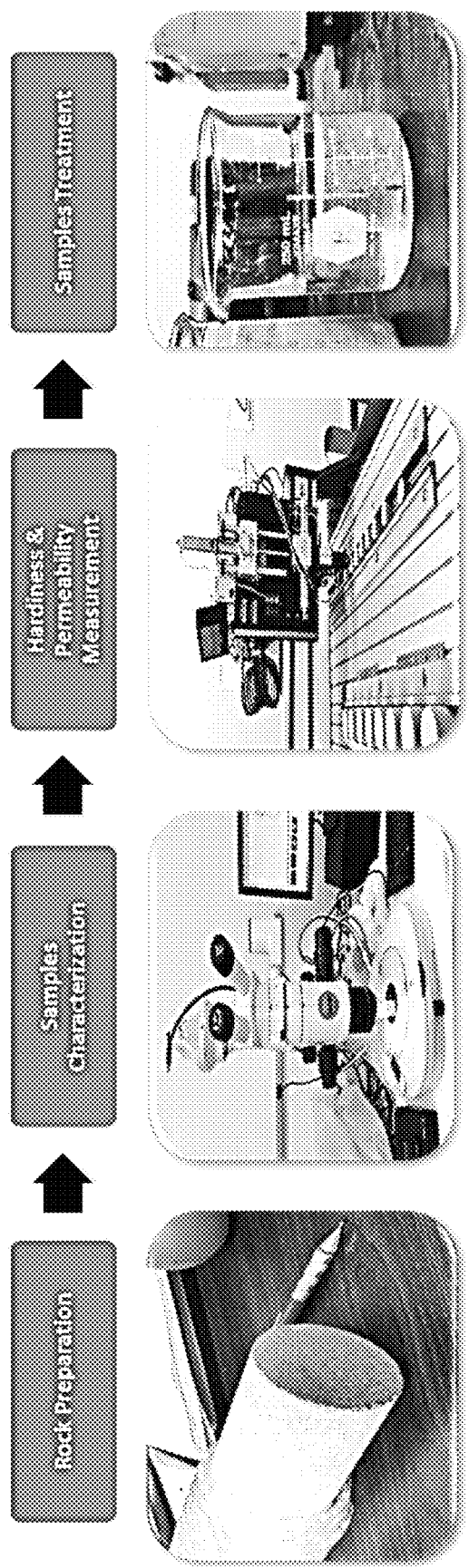
FIG. 1 shows the experimental procedure to verify the impact of chemicals on the rock surface.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" and "composition" is intended to refer to a chemical entity, whether as a solid, liquid, or gas, and whether in a crude mixture or isolated and purified. A composition may further be considered a solution.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of nickel include $^{58}Ni$, $^{60}Ni$, $^{61}Ni$, $^{62}Ni$, and $^{64}Ni$. Isotopes of zinc include $^{66}Zn$, $^{67}Zn$, $^{68}Zn$, and $^{70}Zn$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method for treating a carbonate rock. The method involves the step of contacting the carbonate rock with a composition comprising a zinc salt or a silicon alkoxide, thus forming a treated rock.

In one embodiment, the treated rock has a hardness that is greater than the carbonate rock. In one embodiment, the treated rock has a hardness that is at least 5% greater, at least 10% greater, at least 12% greater, at least 14% greater, at least 15% greater, at least 16% greater, at least 17% greater, at least 20% greater, at least 21% greater, at least 22% greater, at least 23% greater, at least 24% greater, at least 25% greater, than the carbonate rock. In one embodiment, the hardness of the treated rock is 20-80% greater, 21-75% greater, 22-70% greater, 24-65% greater, or 25-60% greater than the carbonate rock. In one embodiment, the hardness of the treated rock is about 10-25% greater, 12-23% greater, 14-20% greater, 15-19% greater, or about 18% greater. In one embodiment, the hardness is determined by measuring Young's modulus. In one embodiment, the method further comprises the step of determining or measuring Young's modulus.

In other embodiments, the general strengthening of the treated rock may be evident by other related parameters. For instance, the stiffness, strength, geometric stiffness, hardness, abrasiveness, and/or toughness may be determined and may show similar percentage increases with the treatment.

In one embodiment, the hardness (or stiffness, toughness, abrasiveness, etc.) of the carbonate rock and the treated rock may be measured and compared at the same location on the rock or at substantially similar locations, for instance, the locations being within 5 mm of each other. In another embodiment, the hardness (or stiffness, toughness, abrasiveness, etc.) may be measured at several locations so that a mean or average may be calculated. In one embodiment, the carbonate rock may have a mean hardness or stiffness (such as Young's modulus) in a range of 5-25 GPa, preferably 7-22 GPa, more preferably 9-18 GPa, even more preferably 10-16 GPa, 12-16 or about 14 GPa. In one embodiment, the treated rock may have a mean hardness or stiffness in a range of 7-27 GPa, preferably 10-25 GPa, more preferably 12-21 GPa, even more preferably 13-19 GPa, 15-19 GPa, or about 17 or 18 GPa. In one embodiment, the mean hardness or mean stiffness of the treated rock may be greater than the carbonate rock by 0.1-5.0 GPa, preferably 0.5-4.5 GPa, more preferably 1.0-4.0 GPa, even more preferably 2.0-4.0 GPa, or about 2.5 or 3.7 GPa.

In one embodiment, the hardness measurement may be measured by using an impulse hammer to determine the Young's modulus of the carbonate rock and treated rock surfaces. For instance, this type of measurement may be performed by an AutoScan® scanner from New England Research, Inc.

In one embodiment, a hardness measurement (or stiffness, toughness, abrasiveness, etc.) of the carbonate rock and the treated rock may be determined by a standard protocol including but not limited to ASTM D5873-14: "Standard Test Method for Determination of Rock Hardness by Rebound Hammer Method," ASTM D 2938: "Test Method for Unconfined Compressive Strength of Intact Rock Core Specimens," ASTM E384: "Standard Test Method for Microhardness of Materials," ASTM D7012: "Test Methods for Compressive Strength and Elastic Moduli of Intact Rock Core Specimens under Varying States of Stress and Temperature," ASTM C131, ASTM C535, and ASTM C418. A hardness measurement may follow a protocol as those described in "Suggested methods for determining hardness and abrasiveness of rocks: International Society for Rock Mechanics, Commission on Standardisation of Laboratory and Field Tests" *Int J Rock Mech Min Sci*, 15, 3, June 1978, 89-97, doi: 10.1016/0148-9062(78)91509-7, incorporated herein by reference in its entirety.

In one embodiment, a hardness measurement (or stiffness, toughness, abrasiveness etc.) of the treated rock may be at least 1.1 times, at least 2.0 times, at least 2.5 times, at least 3.0 times, at least 3.5 times that of a respective measurement of the carbonate rock. In an alternative embodiment, a hardness measurement may be performed by placing broken particles of the carbonate rock or the treated rock within a tester.

In one embodiment, the carbonate rock may have a Moh's hardness of about 3, and the treated carbonate rock may have a Moh's hardness of greater than 3, for instance the Moh's hardness may be in a range of, 3.1-3.2, 3.2-3.3, 3.3-3.4, 3.4-3.5, 3.5-3.6, 3.6-3.7, 3.7-3.8, 3.8-3.9, 3.9-4.0, 4.0-4.2, 4.2-4.5, 4.5-4.7, 4.7-5.0, 5.0-5.2, 5.2-5.5, 5.5-5.7, or 5.7-6.0.

In one embodiment, the carbonate rock may have a Vicker's hardness ($VHN_{10}$) of 100-140 $kg/mm^2$, 110-130 $kg/mm^2$, and the Vicker's hardness of the treated carbonate rock may be 5-500%, preferably 10-400%, more preferably 15-250%, even more preferably 17-100% greater than the carbonate rock.

The contacting may be maintained for a time period of 12-72 h, 16-60 h, 20-56 h, 24-55 h, 36-50 h, preferably 40-50 h, or about 48 h. The contacting may be maintained for a time period of no greater than 72 h, no greater than 60 h, no greater than 56 h, no greater than 55 h, no greater than 50 h, no greater than 49 h, no greater than 48 h. Alternatively, the contacting may be maintained for a time period of no greater than 40 h, no greater than 36 h, no greater than 24 h, no greater than 12 h, no greater than 8 h, no greater than 4 h, no greater than 2 h, no greater than 1 h. The method of contacting may be by dropping, immersion, spraying, rolling, spin coating, spraying, or brushing the composition onto the carbonate rock.

In one embodiment, the carbonate rock may be a carbonate formation rock within a subterranean carbonate formation. Here, the composition may be introduced at an injection flow rate that may be constant or varied, but is no higher than 250 L/s or 0.25 $m^3/s$, or is preferably 5-200 L/s, more preferably 10-150 L/s, even more preferably 50-100 L/s. The composition may be injected at a pressure that is constant or varied, but is no higher than 20,000 psi, or is preferably 1,000-15,000 psi, 1,500-10,000 psi more preferably 2,500-8,500 psi, even more preferably 5,000-7,500 psi, or 500-1,000 psi, or 250-2,000 psi. The injection of the composition enables the composition to contact the carbonate rock.

In one embodiment, the treated rock is less prone to fracture collapse, and thus fracture conductivity and recovery is maintained at a higher level compared to a carbonate rock that was not contacted with the composition. In another embodiment, a treated rock improves the efficiency of a proppant in maintaining fracture conductivity and for reducing proppant embedment and crushing.

In one embodiment, the subterranean carbonate formation is part of a reservoir or petroleum reservoir. For purposes of the present disclosure, the terms "reservoir", "oil reservoir" and "petroleum reservoir" refer to a component of a petroleum system (i.e. hydrocarbon or petroleum-generating and storing geologic system) that is composed of a subsurface body of rock formations having sufficient porosity and permeability to store and transmit fluids. Sedimentary rocks are the most common reservoir rocks because they have more porosity than most igneous and metamorphic rocks and form under temperature conditions at which hydrocarbons can be preserved. Depending on the type of sedimentary rock, reservoirs can be classified as carbonate reservoirs having predominantly limestones, and sandstone reservoirs having primarily siliclastic rocks and clay. In general, carbonate reservoirs tend to have lower primary permeability and salinity compared to sandstone reservoirs.

However, in other embodiments, the carbonate rock may be part of a building exterior or part of an outdoor ornamental structure. For instance, the carbonate rock may be part of a wall, a roof, a tile, a statue, a column, a tomb, a gable stone, a pillar, a stairway, a railing, a cornice, a relief, a fountain, a sculpture, a paver, a spire, a turret, a parapet, an awning, a monument, a marker, a sign, a pyramid, a tombstone, a table, a bench, or some other architectural feature that may be exposed to the elements or prone to weathering. In one embodiment, the carbonate rock may be a single monolith or may comprise more than one piece, such as a wall built from bricks of carbonate rock.

In one embodiment, the carbonate rock comprises at least 85 wt %, preferably at least 87 wt %, more preferably at least 90 wt %, even more preferably at least 95 wt % carbonate salts relative to a total weight. The carbonate salts may comprise magnesium carbonate and/or calcium carbonate. For instance, the carbonate salts may comprise dolomite, magnesite, calcite, aragonite, huntite, hydromagnesite, ikaite, lansfordite, monohydrocalcite, and/or vaterite.

In one embodiment, the carbonate rock comprises at least 85 wt %, preferably at least 87 wt %, more preferably at least 90 wt %, even more preferably at least 95 wt % calcium carbonate relative to a total weight. In a further embodiment, at least 60 wt %, at least 70 wt %, at least 80 wt %, or at least 90 wt % of the calcium carbonate is calcite.

Calcium carbonate exists in different phases and morphologies, for example, vaterite, calcite, and aragonite. Calcium carbonate may also be amorphous, or exist as a combination of more than one phase. Vaterite is a metastable phase of calcium carbonate at ambient conditions at the surface of the earth and belongs to the hexagonal crystal system. Vaterite is less stable than either calcite or aragonite, and has a higher solubility than either of these phases. Therefore, once vaterite is exposed to water, it may convert to calcite (for example, at low temperature) or aragonite (for example, at high temperature: ~60° C.). There are other pathways and methods for conversion of one to the other as well, and the above are presented merely as examples. The vaterite form is uncommon because it is generally thermodynamically unstable.

The calcite form of calcium carbonate is the most stable form, the most abundant in nature, and may have one or more of several different shapes, for example, rhombic and scalenohedral shapes. The rhombic shape is the most common and may be characterized by crystals having approximately equal lengths and diameters, which may be aggregated or unaggregated. Calcite crystals are commonly trigonal-rhombohedral. Scalenohedral crystals are similar to double, two-pointed pyramids and are generally aggregated.

The aragonite form of calcium carbonate is metastable under ambient temperature and pressure, but can be converted to calcite, for example, at elevated temperatures and pressures. The aragonite crystalline form may be characterized by acicular, needle- or spindle-shaped crystals, which can be aggregated, and which typically exhibit high length-to-width or aspect ratios. For instance, aragonite may have an aspect ratio ranging from about 3:1 to about 15:1.

In one embodiment, the method of contacting the carbonate rock with the composition may increase or decrease the phase morphology of the rock. For instance the calcium carbonate of the treated rock may comprise 5-100 wt %, 10-90 wt %, 20-70 wt %, or 30-50 wt % more vaterite by weight than the calcium carbonate of the carbonate rock before being contacted.

In one embodiment, where the composition comprises a zinc salt, the contacting may form $ZnCO_3$ (zinc carbonate, also known as smithsonite or zinc spar) on the carbonate rock. The $ZnCO_3$ may form as additional mass being deposited on the surface of the carbonate rock, and/or by ion exchange between the $Zn^{2+}$ of the zinc salt with the $Ca^{2+}$ of the carbonate rock. For instance, of the total surface area in contact with the composition, 10-95 area %, 15-80 area %, 20-70 area %, 30-50 area % may have $ZnCO_3$ formed by deposition and/or ion exchange during the contacting. The formation of the $ZnCO_3$ may strengthen the carbonate rock.

Figure 2A:
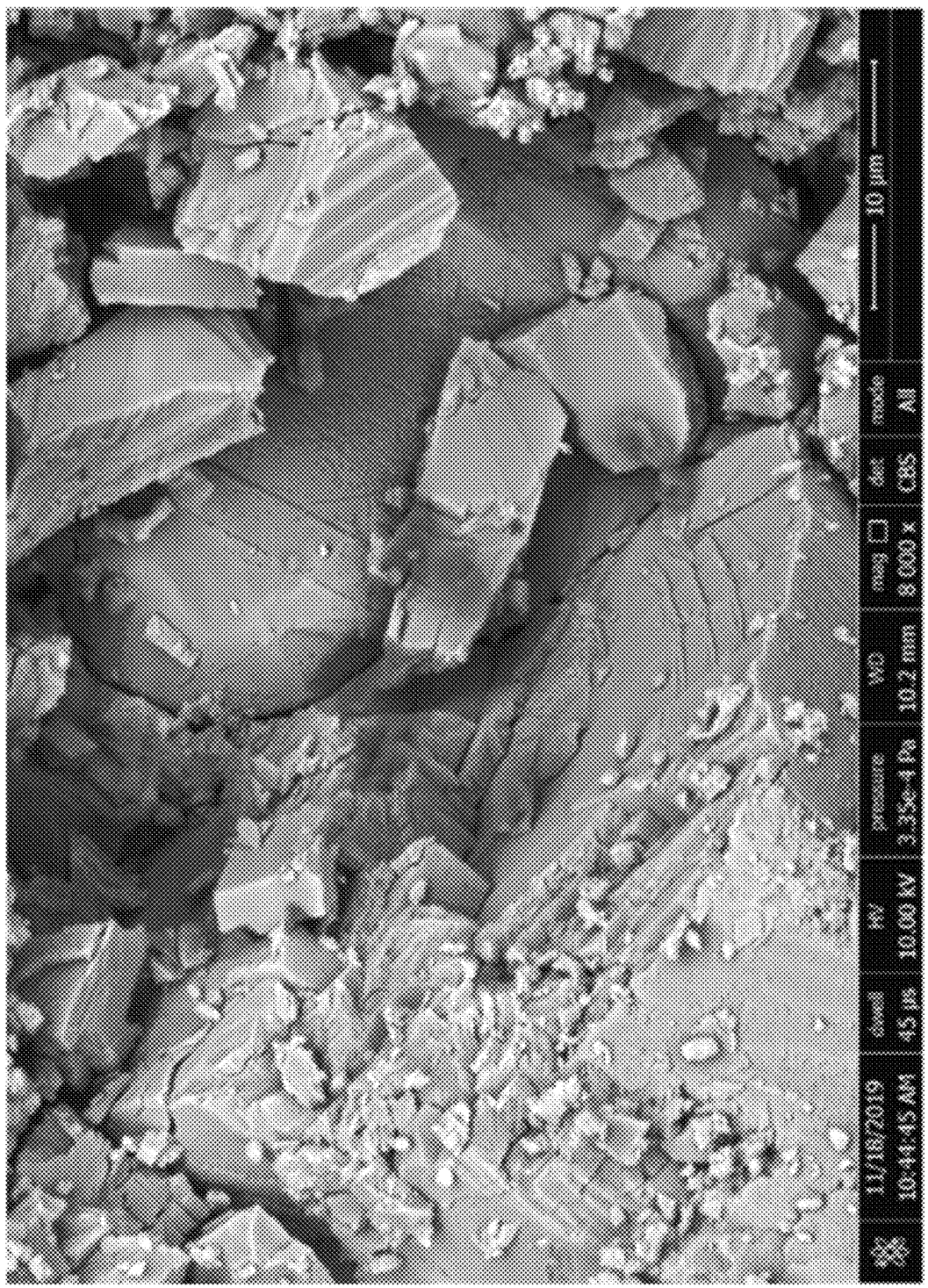
FIG. 2A shows an SEM image of the rock surface before treatment at a magnification of 8,000×.
Figure 2B:
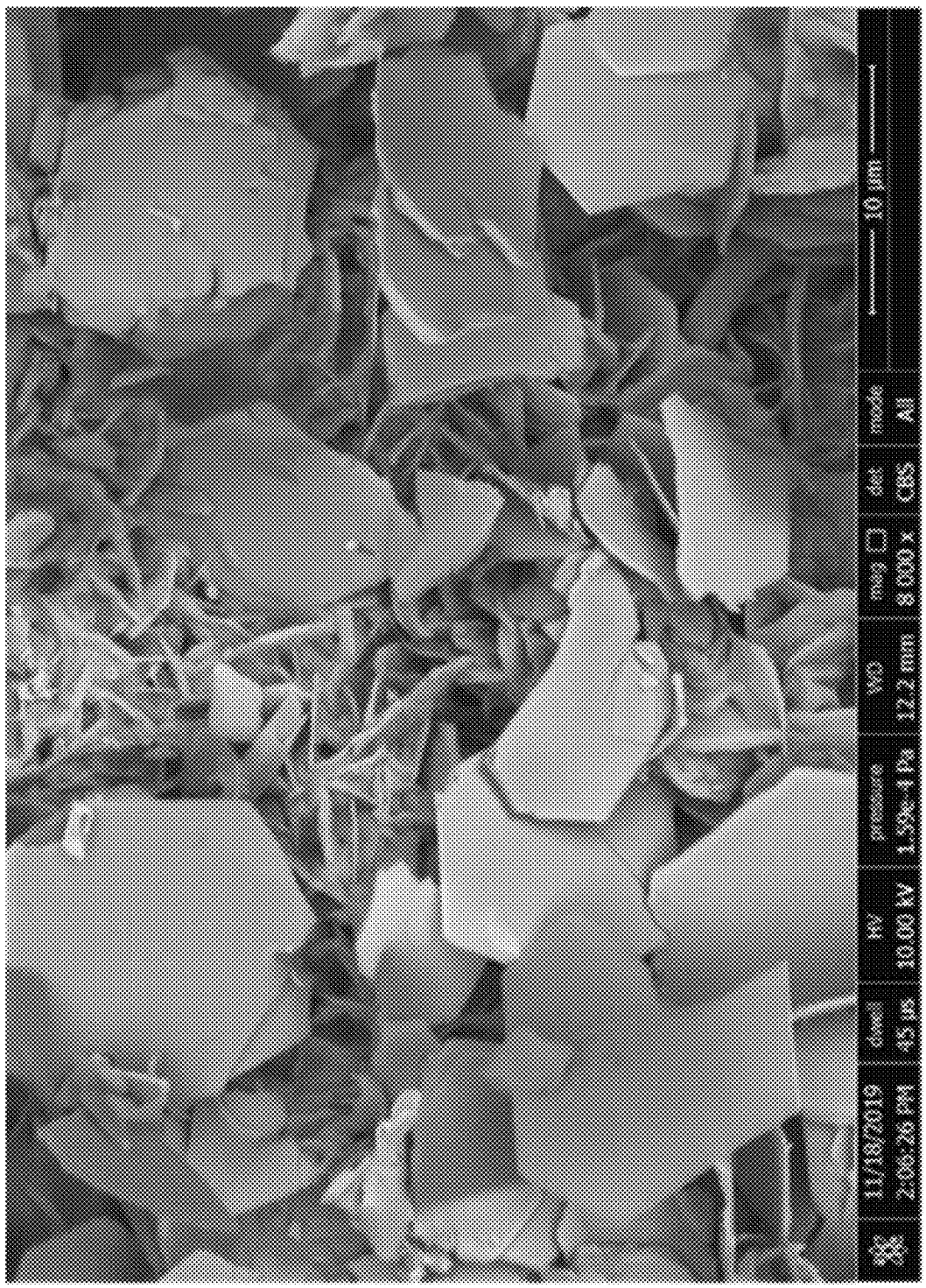
FIG. 2B shows an SEM image of the rock surface after treatment with zinc sulfate at a magnification of 8,000×.

In one embodiment, $ZnCO_3$ may form as nanoplatelets on the surface of the carbonate rock. The nanoplatelets may have an average length or longest dimension in a range of 5-15 μm, preferably 6-13 μm, more preferably 7-11 μm, even more preferably 8-10 μm. The nanoplatelets may have an average thickness in a range of 5-500 nm, preferably 6-250 nm, more preferably 8-200 nm, or 9-50 nm. One example of nanoplatelets on the surface of the carbonate rock is shown in FIG. 2B. In one embodiment, of the total surface area in contact with the composition, 10-95 area %, 15-80 area %, 20-70 area %, 30-50 area % may have $ZnCO_3$ nanoplatelets formed on the exterior surface.

In one embodiment, where the composition comprises a silicon alkoxide, the contacting may form a calcium silicate on the carbonate rock. The calcium silicate may form as additional mass of calcium silicate being deposited on the surface of the carbonate rock, and/or by substitution of carbonate with silicate. In another embodiment, the silicon alkoxide may react to form silica on or within the surface of the carbonate rock. Here, the silica may be amorphous silica or alkylated (hydrophobic) silica. In one embodiment, the silicon alkoxide undergoes a hydrolysis-condensation reaction inside the pores of the carbonate rock, forming a treated rock having amorphous silica within its pores. In one embodiment, the increase of strength of the treated rock is due to the ability of the silicon alkoxide being able to form strong Si—O—Si bonds with the rock surface and/or within the rock pores. In one embodiment, the silicon alkoxide may react with water on the surface of the carbonate rock and/or water within the carbonate rock pores.

The calcium silicate may be a compound formed between $Ca^{2+}$ and a silicate. A silicate may be any member of a family of anions consisting of silicon and oxygen, usually with the general formula $[SiO_{4-x}^{(4-2x)-}]_n$, where $0 \leq x < 2$. These anions include but are not limited to orthosilicate $SiO_4^{4-}$ (x=0), metasilicate $SiO_3^{2-}$ (x=1), polymeric metasilicate $[SiO_3^{2-}]n$, and pyrosilicate $Si_2O_7^{6-}$ (x=0.5, n=2).

In a related embodiment, the carbonate rock may have an exposed surface area, or surface area in fluid communication with a wellbore, that is at least 85%, preferably at least 87%, more preferably at least 90%, even more preferably at least 95% carbonate salts relative to a total exposed surface area. Similarly, the carbonate rock may have an exposed surface area, or surface area in fluid communication with a wellbore, that is at least 85%, preferably at least 87%, more preferably at least 90%, even more preferably at least 95% calcium carbonate relative to a total exposed surface area.

For purposes of the present disclosure, the term "permeability" refers to the ability, or measurement of a reservoir rock ability, to transmit fluids and is typically measured in darcies (D) or millidarcies (mD). Formations that transmit fluids readily, such as sandstones, are described as permeable and tend to have many large, well-connected pores. Impermeable formations tend to be finer grained or of a mixed grain size, with smaller, fewer, or less interconnected pores. As used herein, a "low-permeability reservoir" refers to an oil reservoir having a range of permeability that is no higher than 10 mD, or is preferably 0.05-10 mD, more preferably 0.1-7.5 mD, even more preferably 0.5-5 mD, most preferably 1-5 mD. Accordingly, as used herein a "high-permeability reservoir" refers to an oil reservoir having a range of permeability that is higher than 10 mD.

ASTM D4525-13e2: "Standard Test Method for Permeability of Rocks by Flowing Air," ASTM D4630-19 "Standard Test Method for Determining Transmissivity and Storage Coefficient of Low-Permeability Rocks by In Situ Measurements Using the Constant Head Injection Test," ASTM D6539-13 "Standard Test Method for Measurement of the Permeability of Unsaturated Porous Materials by Flowing Air," and ASTM D5856: "Test Method for Measurement of Hydraulic Conductivity of Porous Material Using a Rigid-Wall, Compaction-Mold Permeameter."

In one embodiment, the carbonate rock has a permeability in a range of 4-10 mD, preferably 5-9 mD, more preferably 6-8 mD. In one embodiment, the carbonate rock has a permeability in a range of 8-22 mD, preferably 10-20 mD, more preferably 12-18 mD, even more preferably 14-16 mD.

In one embodiment, the treated rock has a permeability that is decreased by 40-80%, preferably 45-75%, more preferably 50-70%, even more preferably 55-65% relative to a permeability of the carbonate rock.

For purposes of the present disclosure, the term "porosity" refers to the percentage or ratio of void space to the pore volume (PV) of a rock, or that total volume within the rock that can contain or hold fluids, which is typically no more than 20-25% for both sandstone and carbonate reservoirs. "Total porosity" is the total void space in the rock whether or not it contributes to fluid flow. Thus, effective porosity is typically less than total porosity. In one embodiment, the treated rock has a total porosity or effective porosity that is decreased by 40-80%, preferably 45-75%, more preferably 50-70%, even more preferably 55-65% relative to a total porosity or effective porosity of the carbonate rock.

In one embodiment, the permeability may be measured by a standard protocol, including but not limited to ASTM D4404-18: "Standard Test Method for Determination of Pore Volume and Pore Volume Distribution of Soil and Rock by Mercury Intrusion Porosimetry," ASTM D5084-16a "Standard Test Methods for Measurement of Hydraulic Conductivity of Saturated Porous Materials Using a Flexible Wall Permeameter," and ASTM C127-07. In one embodiment, the permeability may be measured by a gas permeameter, for instance, a GP-101AE gas permeameter. In one embodiment, a steady state gas permeameter may be used.

In one embodiment, in terms of wellbore productivity, a decrease in permeability and/or porosity is outweighed by the increased recovery of reservoir fluids by maintaining a fracture length and conductivity.

In one embodiment, the composition comprises the zinc salt at a concentration in a range of 0.01-1.0 M, preferably 0.05-0.80 M, more preferably 0.10-0.70 M, even more preferably 0.20-0.75 M, 0.25-0.70 M, 0.30-0.60 M, 0.45-0.55 M, or about 0.50 M. In one embodiment, the zinc salt is at least one selected from the group consisting of $ZnCl_2$, $ZnBr_2$, $ZnI_2$, $ZnF_2$, $ZnCl_2$, ZnO, ZnS, $ZnSO_4$, ZnSe, $Zn(OH)_2$, $Zn(NO_3)_2$, $Zn_3(PO_4)_2$, $ZnCO_3$, and $Zn(HCO_3)_2$. In one embodiment, the zinc salt is at least one selected from the group consisting of $ZnSO_4$, $Zn(OH)_2$, and $Zn_3(PO_4)_2$. In a preferred embodiment, the zinc salt is $ZnSO_4$. The zinc salt may dissolve completely or partially in the composition. In an alternative embodiment, a zinc salt may be used that is generally insoluble in the composition.

In one embodiment, the composition comprises a silicon alkoxide. The silicon alkoxide may be tetraethyl orthosilicate, tetramethyl orthosilicate, tetrapropyl orthosilicate, and/or tetrabutyl orthosilicate. In a preferred embodiment, the silicon alkoxide is tetraethyl orthosilicate (TEOS), also called tetraethoxysilane. The silicon alkoxide may be present in the composition at a concentration in a range of 7.5-100 wt %, preferably 8.0-80 wt %, more preferably 8.5-70 wt %, more preferably 9.0-50 wt %, even more preferably 9.0-20 wt %, 9.0-15 wt %, or 9.5-12 wt %, or about 10 wt % relative to a total weight of the composition. In one embodiment, the composition may consist essentially of TEOS, meaning that the composition comprises at least 99.5 wt %, at least 99.9 wt % TEOS relative to a total weight of the composition.

In a further embodiment, where the composition comprises a silicon alkoxide, the composition may further comprise a catalyst, including but not limited to dibutyltin dilaureate (DBTL), dibutyltin dioctanoate, dibutyltin diacetate, and/or dibutyltin maleate to promote a hydrolysis-polycondensation reaction of the silicon alkoxide. The catalyst may be present at a concentration in a range of 0.1-5 wt %, preferably 0.5-2.5 wt %, more preferably 0.8-1.2 wt % relative to a total weight of the composition.

In one embodiment, the composition comprises water. The water may be tap water, distilled water, bidistilled water, deionized water, deionized distilled water, reverse osmosis water, and/or some other water. In one embodiment the water is bidistilled to eliminate trace metals. Preferably the water is bidistilled, deionized, deionized distilled, or reverse osmosis water and at 25° C. has a conductivity at less than 10 μS·cm$^{-1}$, preferably less than 1 μS·cm$^{-1}$, a resistivity greater than 0.1 MΩ·cm, preferably greater than 1 MΩ·cm, more preferably greater than 10 MΩ·cm, a total solid concentration less than 5 mg/kg, preferably less than 1 mg/kg, and a total organic carbon concentration less than 1000 μg/L, preferably less than 200 μg/L, more preferably less than 50 μg/L.

In one embodiment, the composition may comprise a brine. The brine may have a wide salinity range of 500-200,000 ppm, preferably 1,000-100,000 ppm, more preferably 2,500-75,000 ppm. Minerals contained in the brine solution include but are not limited to chloride, sodium, sulfate, magnesium, calcium, potassium, bicarbonate, carbonate, bromide, boron, strontium, and fluoride. In another embodiment, "brine" may be used more generally to refer to an aqueous solution of a salt, and includes sea water.

In one embodiment, the composition consists essentially of the zinc salt and water, meaning that at least 99 wt %, preferably at least 99.5 wt %, more preferably at least 99.9 wt %, even more preferably at least 99.99 wt % of the composition is zinc salt and water, relative to a total weight of the composition. In one embodiment, the composition consists of the zinc salt and water, and the concentration of the zinc salt is 0.30-0.60 M.

In one embodiment, the composition consists essentially of the silicon alkoxide and water, meaning that at least 99 wt %, preferably at least 99.5 wt %, more preferably at least 99.9 wt %, even more preferably at least 99.99 wt % of the composition is the silicon alkoxide and water, relative to a total weight of the composition.

In one embodiment, the composition comprises an organic solvent. In one embodiment, the organic solvent may include ethers (e.g. diethyl ether, tetrahydrofuran, 1,4-dioxane, tetrahydropyran, t-butyl methyl ether, cyclopentyl methyl ether, di-iso-propyl ether), glycol ethers (e.g. 1,2-dimethoxyethane, diglyme, triglyme), alcohols (e.g. methanol, ethanol, trifluoroethanol, n-propanol, i-propanol, n-butanol, i-butanol, t-butanol, n-pentanol, pentanol, 2-methyl-2-butanol, 2-trifluoromethyl-2-propanol, 2,3-dimethyl-2-butanol, 3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, cyclohexanol), aromatic solvents (e.g. benzene, o-xylene, m-xylene, p-xylene, mixtures of xylenes, toluene, mesitylene, anisole, 1,2-dimethoxybenzene, α,α,α-trifluoromethylbenzene, fluorobenzene), chlorinated solvents (e.g. chlorobenzene, dichloromethane, 1,2-dichloroethane, 1,1-dichloroethane, chloroform), ester solvents (e.g. ethyl acetate, propyl acetate), amide solvents (e.g. dimethylformamide, dimethylacetamide, N-methyl-2-pyrrolidone), urea solvents, ketones (e.g. acetone, butanone), acetonitrile, propionitrile, butyronitrile, benzonitrile, dimethyl sulfoxide, ethylene carbonate, propylene carbonate, 1,3-dimethyl-3,4,5,6-tetrahydro-2(1H)-pyrimidinone, non-polar solvents (e.g. hexane, benzene, toluene, diethyl ether, chloroform, 1,4-dioxane), polar aprotic solvents (e.g. ethyl acetate, tetrahydrofuran, dichloromethane, acetone, acetonitrile, dimethylformamide, dimethyl sulfoxide), polar protic solvents (e.g. acetic acid, n-butanol, isopropanol, n-propanol, ethanol, methanol, formic acid), and mixtures thereof. In a preferred embodiment, the organic solvent is ethanol, methanol, or isopropanol. Preferably the organic solvent is ethanol.

In one embodiment, the organic solvent is in a liquid state at room temperature (20-27° C.). The organic solvent may be a linear or branched alkane with a general formula of $C_nH_{2n+2}$, where n may have a value of 5-18, preferably 10-17, more preferably 12-16. In another embodiment, the nonpolar compound may have a surface tension at 19-22° C. of 10-50 mN/m, preferably 15-40 mN/m, more preferably 20-35 mN/m. In other embodiments, the organic solvent may be some other organic molecule with a nonpolar or hydrophobic character and similar surface tension. In other embodiments, the organic solvent may be a mixture of organic molecules, for instance, a plant-based oil or a petroleum product such as mineral oil. In one embodiment, the organic solvent is at least one selected from the group consisting of hexane, heptane, octane, toluene, xylene, benzene, cycloheptane, cyclohexane, cyclohexene, dodecane, methylcyclohexane, toluene, octadecene, turpentine, pentane, cyclopentane, pentamethylbenzene, tridecane, white spirits, mineral spirits, petroleum ethers, petroleum spirits, petroleum benzine, and a petroleum-derived liquid. In one embodiment, the organic solvent is, or comprises, a petroleum-derived liquid or a petroleum product, such as crude oil, ligroin, kerosene, paraffin oil, motor oil, dimethyl ether, biodiesel, gasoline, diesel, heating oil, jet fuel, naptha, tar, and/or some other natural gas condensate or petroleum distillate. In one embodiment, the organic solvent is gasoline (petrol) and/or diesel. In one embodiment, the organic solvent is a mixture of at least two, at least three, at least four, at least five, or at least six compounds such as those previously described.

In one embodiment, the organic solvent may be present in an emulsion, preferably an oil-in-water emulsion where the organic solvent is considered the oil phase. In a further embodiment, the oil or organic solvent is a petroleum product. An emulsion is a mixture of two or more liquids that are normally immiscible (unmixable or unblendable). Two liquids can form different types of emulsions. As an example, oil and water can form, first, an oil-in-water emulsion, wherein the oil is the dispersed phase, and water is the continuous phase. Second, they can form a water-in-oil emulsion, wherein water is the dispersed phase and oil is the continuous phase. Multiple emulsions are also possible, including a "water-in-oil-in-water" emulsion and an "oil-in-water-in-oil" emulsion.

In one embodiment, the composition consists essentially of the zinc salt and organic solvent, meaning that at least 99 wt %, preferably at least 99.5 wt %, more preferably at least 99.9 wt %, even more preferably at least 99.99 wt % of the composition is zinc salt and organic solvent, relative to a total weight of the composition.

In one embodiment, the composition consists essentially of the silicon alkoxide and organic solvent, meaning that at least 99 wt %, preferably at least 99.5 wt %, more preferably at least 99.9 wt %, even more preferably at least 99.99 wt % of the composition is the silicon alkoxide and organic solvent, relative to a total weight of the composition.

In one embodiment, the composition does not contain water. In one embodiment, the composition contains less than 1 wt % water, preferably less than 0.1 wt % water, more preferably less than 0.01 wt % water, or less than less than 0.001 wt % water, relative to a total weight of the composition. In one embodiment, the composition may comprise a desiccant to maintain a very low water concentration, or maintain a water-free environment.

In one embodiment, where the composition does not contain water, the method may comprise a step of adding or injecting water to dilute and/or rinse the composition.

In one embodiment, the composition does not contain perlite. In one embodiment, the composition does not contain solid particles. In one embodiment, the composition does not contain calcium silicate. In one embodiment, the composition does not contain a sealant such as an epoxy, polymer, or the like. In one embodiment, the composition does not contain proppant particles. In one embodiment, the composition does not contain silane. In one embodiment, the composition does not contain silica or silica particles.

In one embodiment, the composition may comprise an acid. The acid may be a weak organic acid such as citric acid, formic acid, acetic acid, propionic acid, butyric acid, valeric acid, caproic acid, oxalic acid, lactic acid, malic acid, benzoic acid, and carbonic acid.

In another embodiment, the carbonate rock, being located in a subterranean formation, is subjected to acid fracturing before the contacting with the composition. Thus, the method may further comprise acid fracturing the carbonate rock before the contacting. In this instance, $CO_2$ may be evolving from the acid fracturing process at the time the carbonate rock is contacted with the composition. In one embodiment, the contacting with the composition is performed after acid fracturing that does not use a water flush. In another embodiment, the contacting with the composition may be done after a water flush following the acid fracturing. Similarly, where the carbonate rock is an exterior of a building or part of an outdoor ornamental structure or other structure, the carbonate rock may be acid treated either intentionally by contacting with an acid, or unintentionally, for instance, by contact with acidified rainfall (acid rain).

In an alternative embodiment, the composition may be encapsulated within a capsule having a polymeric shell. The capsules may be delivered to the carbonate rock where reservoir temperature may thermally degrade the polymeric shell, thus releasing the composition to contact the rock.

The polymeric shell may have a wall thickness that is preferably no greater than 2 μm or 2000 nm, or is preferably 25-1000 nm, more preferably 50-750 nm, even more preferably 100-500 nm, so that the wall can rupture easily to release the contents when subjected to the high temperatures of the reservoir or wellbore. In one embodiment, the capsule is of a generally spherical or round shape having a diameter range of 0.1-50 μm, preferably 0.2-20 μm, 0.5-20 μm, 1.0-20 μm, 5-20 μm, 10-20 μm, 15-20 μm, more preferably 0.1-10 μm, 0.1-5.0 μm, 0.2-5.0 μm, even more preferably 0.1-2.0 μm, 0.2-2.0 μm, 0.5-2.0 μm, 1.0-2.0 μm, most preferably 0.1-1.0 μm, 0.2-1.0 μm, 0.1-0.5 μm, 0.2-0.5 μm. In another embodiment, the capsule is oval or rod-shaped where the large diameter (for the oval) or length (for the rod) ranges from 0.5-75 μm, preferably 1.0-60 μm, 5.0-50 μm, more preferably 7.5-30 μm, 10-30 μm, 10-25 μm, 15-25 μm while the small diameter or width ranges from 0.05-20 μm, preferably 0.1-10 μm, more preferably 0.1-5.0 μm, 0.2-5.0 μm, 0.5-5.0 μm, 0.1-2.5 μm, 0.2-2.5 μm, 0.5-2.5 μm. Generally, if a carbonate rock has low permeability, the treatment method in accordance with the present disclosure may require the capsules to have a smaller size. The capsule can also assume other common shapes such as oblong, bullet, tubular, and even less common geometrical shapes like square, rectangular, triangular, and cylindrical.

To avoid adding undesirable impurities to the extracted reservoir fluids, the polymeric capsule shell may be advantageously free of elements such as but not limited to silicon, phosphorus, fluorine, bromine, chlorine and sulfur. Acceptable elements of the polymer shell include carbon, hydrogen, oxygen and nitrogen.

To accelerate the degradation rate of a capsule, the polymeric shell may be advantageously free of chemical crosslinking agents. As used herein, "chemical crosslinkers" or "chemical crosslinking agents" are molecules that form thermally stable covalent bonds or chemical crosslinks with two or more polymer chains in a polymer, to link one polymer chain to another, in order to promote mechanical strength and thermal stability of the polymer. Examples of crosslinkers commonly used in manufacturing of polymers include 4-vinylbenzocyclobutene, trimethylolpropane ethoxylate, triethylene glycol dimethacrylate, poly(ethylene glycol) diacrylate, poly(ethylene glycol) bisazide, 1,4-phenylenediacryloyl chloride, pentaerythritol propoxylate, pentaerythritol ethoxylate, 1,1-maleimidoundecanoic acid, hexa(ethylene glycol) dithiol, glycerol ethoxylate, p-divinylbenzene, divinylbenzene, 1,4-bis(4-vinylphenoxy) butane and bis(2-methacryloyl)oxyethyl disulfide. Molecules that form heat-reversible physical crosslinks such as hydrogen bonds between polymer chains may be acceptable to incorporate into the polymeric capsule shell, but are not required.

Once placed deep inside the oil reservoir (or in contact or in proximity of the carbonate rock), the capsules are left to incubate in the natural reservoir temperature which will trigger breakdown of the capsules to release the contents. This process may be described as thermal physical degradation or thermal decomposition.

For purposes of the present disclosure, the term "thermal physical degradation" refers to a process whereby the action of heat or elevated temperature on a polymer causes a change or loss of physical, mechanical and/or electrical properties.

For purposes of the present disclosure, the term "thermal decomposition" or "thermal chemical degradation" refers to a process of chemical species change in a polymer that is caused by heat, which involves scission of one or more covalent bonds such as but not limited to a carbon-carbon bond (single, double or triple), a carbon-hydrogen bond, a carbon-oxygen bond (single or double), a carbon-nitrogen bond, an ester bond, or an amide bond.

Reservoir temperature is primarily governed by the reservoir's proximity to the earth's mantle, and by the relative heat exchange capacities and thermal conductivities of the formations. The reservoir temperature may range from 50-120° C., with an average temperature of 75-85° C. The capsules may be incubated for at least 12 h, preferably 12-36 h, more preferably 18-30 h, even more preferably 20-28 h, most preferably 22-26 h, or for the length of time as previously described for contacting with the composition.

In another embodiment, capsules may be used to encapsulate an acid, such as weak acid listed above, or a strong acid such as hydrochloric acid, hydrobromic acid, sulfuric acid, sulfamic acid, phosphoric acid, and nitric acid. In another embodiment, the capsules may be used to encapsulate any other additive or compound listed within this disclosure.

In one embodiment, the composition further comprises a proppant. The proppant may be particles of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, sand (e.g. quartz sand grains), sintered bauxite, bauxite grains, walnut shell fragments, aluminum pellets, nylon pellets, calcium carbonate, other sized salts, glass, ceramic beads, and the like, and mixtures thereof. Specific suitable piezoelectric crystal particles may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. In one embodiment, the proppant may have a diameter in a range of 1 µm-3 mm, preferably 10 µm-1 mm, more preferably 20 µm-500 µm, even more preferably 50 µm-400 µm, 60-300 µm, 70-250 µm. In another embodiment, the proppant may have a diameter in a range of 10 nm-1 µm, 20-800 nm, 30-700 nm, 40-600 nm, 50-500 nm, 60-400 nm.

In one embodiment, the composition may further comprise an additive selected from the group consisting of surfactants, mutual solvents, anti-sludge agents, water-wetting or emulsifying surfactants, corrosion inhibitor intensifiers, foaming agents, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives, particulates, crosslinkers, salt substitutes, relative permeability modifiers, sulfide scavengers, fibers, and nanoparticles.

In one embodiment, the composition further comprises a silane, which may react with the carbonate rock. In other words, the carbonate rock is treated with a silane, or "silanized." The silane may be a siloxane. In general, siloxanes are any of a class of organic or inorganic chemical compounds comprising silicon, oxygen, and often carbon and hydrogen, based on the general empirical formula of $R_2SiO$, where R may be an alkyl group. Exemplary siloxanes include, but are not limited to, dimethylsiloxane, methylphenylsiloxane, methylhydrogen siloxane, methyltrimethoxysilane, octamethylcyclotetrasiloxane, hexamethyldisiloxane, diphenylsiloxane, and copolymers or blends of copolymers of any combination of monophenylsiloxane units, diphenylsiloxane units, phenylmethylsiloxane units, dimethylsiloxane units, monomethylsiloxane units, vinylsiloxane units, phenylvinylsiloxane units, methylvinylsiloxane units, ethylsiloxane units, phenylethylsiloxane units, ethylmethylsiloxane units, ethylvinylsiloxane units, or diethylsiloxane units.

In one embodiment, the silane is an ionic silane. Exemplary ionic silanes include, but are not limited to, 3-(trimethoxysilyl)propyl-ethylenediamine triacetic acid trisodium salt and 3-(trihydroxysilyl)propylmethylphosphonate salt. In one embodiment, the carrier material is subjected to at least one surface treatment with at least one silane of Formula (I):

$$(R^1)_x Si(R^2)_{3-x} R^3 \qquad (I)$$

wherein: $R^1$ is any hydrolysable moiety that may chemically react with any active group on the surface of the coarse and/or fine mineral, such as but not limited to alkoxy, halogen, hydroxy, aryloxy, amino, amide, methacrylate, mercapto, carbonyl, urethane, pyrrole, carboxy, cyano, aminoacyl, or acylamino, alkyl ester, and aryl ester; "x" has a value between 1 and 3, such that more than one siloxane bond may be formed between the coarse and/or fine mineral and the at least one silane; $R^2$ is any carbon-bearing moiety that does not substantially react or interact with the coarse and/or fine mineral during the treatment process, such as but not limited to substituted or unsubstituted alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, and arylalkaryl; $R^3$ is any organic containing moiety that remains substantially chemically attached to the silicon atom of Formula (I) once the at least one surface treatment is completed and that is capable or reacting or interacting with the at least one active ingredient, such as but not limited to hydrogen, alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, arylalkaryl, alkoxy, halogen, hydroxy, aryloxy, amino, amide, methacrylate, mercapto, carbonyl, urethane, pyrrole, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkylisothiouronium; wherein the hydrogen of said alkyl, alkenyl, aryl, cycloalkyl, cycloalkenyl, heteroaryl, and heterocyclic is optionally substituted by, for example, halogen, hydroxy, amino, carboxy, or cyano.

In one embodiment, the composition may further comprise a surfactant. The surfactant may be an ionic surfactant, a non-ionic surfactant, or a biological surfactant.

Exemplary ionic surfactants include, but are not limited to, (1) anionic (based on sulfate, sulfonate or carboxylate anions), for example, perfluorooctanoate (PFOA or PFO), perfluorooctanesulfonate (PFOS), sodium dodecyl sulfate (SDS), ammonium lauryl sulfate, and other alkyl sulfate salts, sodium laureth sulfate (SLS, and also known as sodium lauryl ether sulfate (SLES)), alkyl benzene sulfonate, soaps, and fatty acid salts; (2) cationic (based on quaternary ammonium cations), for example, cetyl trimethylammonium bromide (CTAB) (also known as hexadecyl trimethyl ammonium bromide), and other alkyltrimethylammonium salts, cetylpyridinium chloride (CPC), polyethoxylated tallow amine (POEA), benzalkonium chloride (BAC), and benzethonium chloride (BZT); and (3) zwitterionic (amphoteric), for example, dodecyl betaine, cocamidopropyl betaine, and coco ampho glycinate.

Exemplary nonionic surfactants include, but are not limited to, alkyl poly(ethylene oxide), alkylphenol poly(ethylene oxide), copolymers of poly(ethylene oxide) and poly(propylene oxide) (commercially known as Poloxamers or Poloxamines), polyoxyethylene octyl phenyl ether (TRITON X-100®), alkyl polyglucosides, for example, octyl glucoside and decyl maltoside, fatty alcohols, for example, cetyl alcohol and oleyl alcohol, cocamide MEA, cocamide DEA, and polysorbates (commercially known as TWEEN 20, TWEEN 80), for example, dodecyl dimethylamine oxide.

Exemplary biological surfactants include, but are not limited to, micellular-forming surfactants or surfactants that form micelles in solution, for example, DNA, vesicles, phospholipids, and combinations thereof.

In one embodiment, the composition may comprise a carbonate or a bicarbonate. The carbonate may be a salt or species having the anion $CO_3^{2-}$. The bicarbonate may be a salt or species having the anion $HCO_3^{1-}$. Example carbonates and bicarbonates include but are not limited to sodium bicarbonate, sodium carbonate, magnesium bicarbonate, magnesium carbonate, calcium bicarbonate, calcium carbonate, barium bicarbonate, barium carbonate, lithium bicarbonate, lithium carbonate, potassium bicarbonate, potassium carbonate, and carbonic acid.

In one embodiment, the proppant, silane, additive, surfactant, carbonate, and/or bicarbonate may be present in the composition at a concentration in a range of 0.001-50 wt %, preferably 0.005-40 wt %, more preferably 0.01-30 wt %, 0.05-20 wt %, 0.1-15 wt %, 0.2-12 wt %, 0.3-10 wt %, 0.4-9 wt %, 0.1-20 wt %, 0.2-15 wt %, 0.5-10 wt %, 1.0-10.0 wt %, 2-8 wt %, 3-7 wt %, or 0.5-5 wt %, relative to a total weight of the composition.

In one embodiment, any proppant, capsule, or other solid compound used in or with the composition may further comprise a coating agent. Suitable coating agents include, but are not necessarily limited to, water, brines, glycols, glycol ethers, alcohols, ketones, terpenes, alkyl esters, aromatic compounds, mineral oils or other refined hydrocarbons that accomplishes the purposes of the methods and compositions described herein. Specific, non-limiting examples of suitable glycols include, but are not necessarily limited to, propylene glycol, and the like dipropylene glycol, tripropylene glycol, polypropylene glycol, ethylene glycol, diethylene glycol, triethylene glycol, and combinations thereof, while suitable alcohols include, but are not necessarily limited to methanol, isopropanol, 1-propanol, hexanol, butanol, octanol and combinations thereof, and suitable glycol ethers include, but are not necessarily limited to ethylene glycol monobutyl ether, ethylene glycol monohexyl ether, diethylene glycol monomethyl ether, propylene glycol monomethyl ether, propylene glycol n-butyl ether, dipropylene glycol dimethyl ether, tripropylene glycol n-butyl ether, and combinations thereof. Specific, non-limiting examples of suitable ketones include, but are not necessarily limited to acetone, diethyl ketone, methyl ethyl ketone, methyl propyl ketone, cyclohexanone and combinations thereof. Specific, non-limiting examples of suitable terpenes include d-limonene, pinene, and combinations thereof. Specific, non-limiting examples of suitable alkyl esters include, but are not necessarily limited to methyl acetate, ethyl acetate, ethyl formate, ethyl propionate, methyl benzoate, methylethyl benzoate, and combinations thereof. Specific, non-limiting examples of suitable aromatic compounds include, but are not necessarily limited to benzene, toluene, xylene, naphthalene and combinations thereof. Specific, non-limiting examples of suitable mineral oils include ConocoPhillips PURE PERFORMANCE® Base Oil, such as 225N and 600N oils. Other coating agents include sorbitan esters, ethoxylated sorbitan esters, ethoxylated alcohols, ethoxylated alkyl-phenols, alkyl-dicarboxylics, sulfosuccinates, phospholipids, alkylamines, quaternary amines, alkyl-siloxanes, and the like. It is not necessary that a resin be used as a coating agent or binder, and in one non-limiting embodiment, no resin is used. Water or brines may also be effective coating agents to help coat particles such as sand and ceramic particles. A polymer in water or brine may also be employed to help coat particles like proppant.

In one embodiment, the treated rock may be dried following the contacting. For instance, the treated rock may be dried at a temperature in a range of 50-150° C., preferably 52-130° C., more preferably 55-100° C., even more preferably 57-80° C., or about 60° C., or a time period in a range of 1-24 h, preferably 2-12 h, more preferably 3-8 h, or about 4 h.

The examples below are intended to further illustrate protocols for strengthening carbonate rock with a composition of a zinc salt or a silicon alkoxide, and are not intended to limit the scope of the claims.

Example 1

Two chemicals (tetraethyl orthosilicate and zinc sulfate) were tested and shown to provide promising results in terms of improving carbonate rock hardness. These two different chemicals increased the carbonate rock hardness by 10-35%. These chemicals may be applied for hydraulic fracturing and art preservation.

Example 2

Procedure

The procedure is summarized in FIG. 1 as follows:
1. Cutting slabs of carbonate rocks
2. Characterizing the rock using scanning electron microscopy (SEM) and x-ray fluorescence (XRF)
3. Measuring permeability and rock hardness using AutoScan®
4. Treating the rock surface with zinc sulfate or TEOS
5. Repeat 2-3 steps The surface treatment can be summarized as follows:
a. Prepare zinc sulfate solution by dissolving 3.55 g of zinc sulfate salt in 250 mL water to get a concentration of 0.1 M zinc sulfate, using a magnetic stirrer as needed.
b. Prepare another solution by diluting TEOS unit volume with 10 times of water, or use TEOS without dilution.
c. Immerse a rock sample in each solution for 48 hrs.
d. Dry the samples for 4 h at 60° C.

Example 3

Results

The rock surface before and after the treatment was characterized using SEM and XRF. Different SEM images with different magnification were used. FIGS. 2A and 2B show the rock surface before and after treatment with zinc sulfate, respectively, at an 8,000× magnification. The role that zinc sulfate plays is to change the calcite ($CaCO_3$) into the harder mineral smithsonite ($ZnCO_3$).

Figure 3:
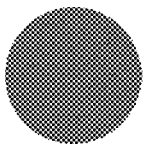
FIG. 3 shows the change in elements as visualized by XRF of the rock before and after treatment with zinc sulfate, scale bar 2.5 inches.
Figure 3:
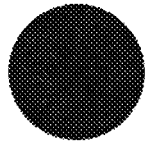
Figure 3:
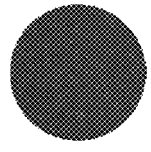
Figure 3:
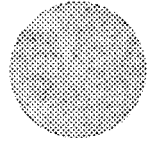
Figure 3:
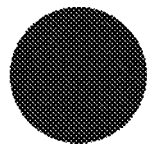
Figure 3:
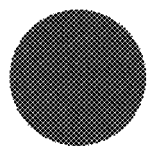
Figure 3:
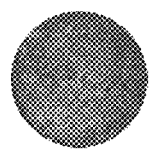
Figure 3:
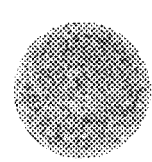
Figure 3:
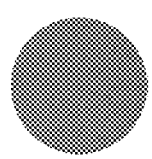
Figure 3:
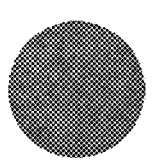

The elemental distribution change is illustrated in FIG. 3. The main remark is the increase of zinc and the decrease of calcium.

Figure 4:
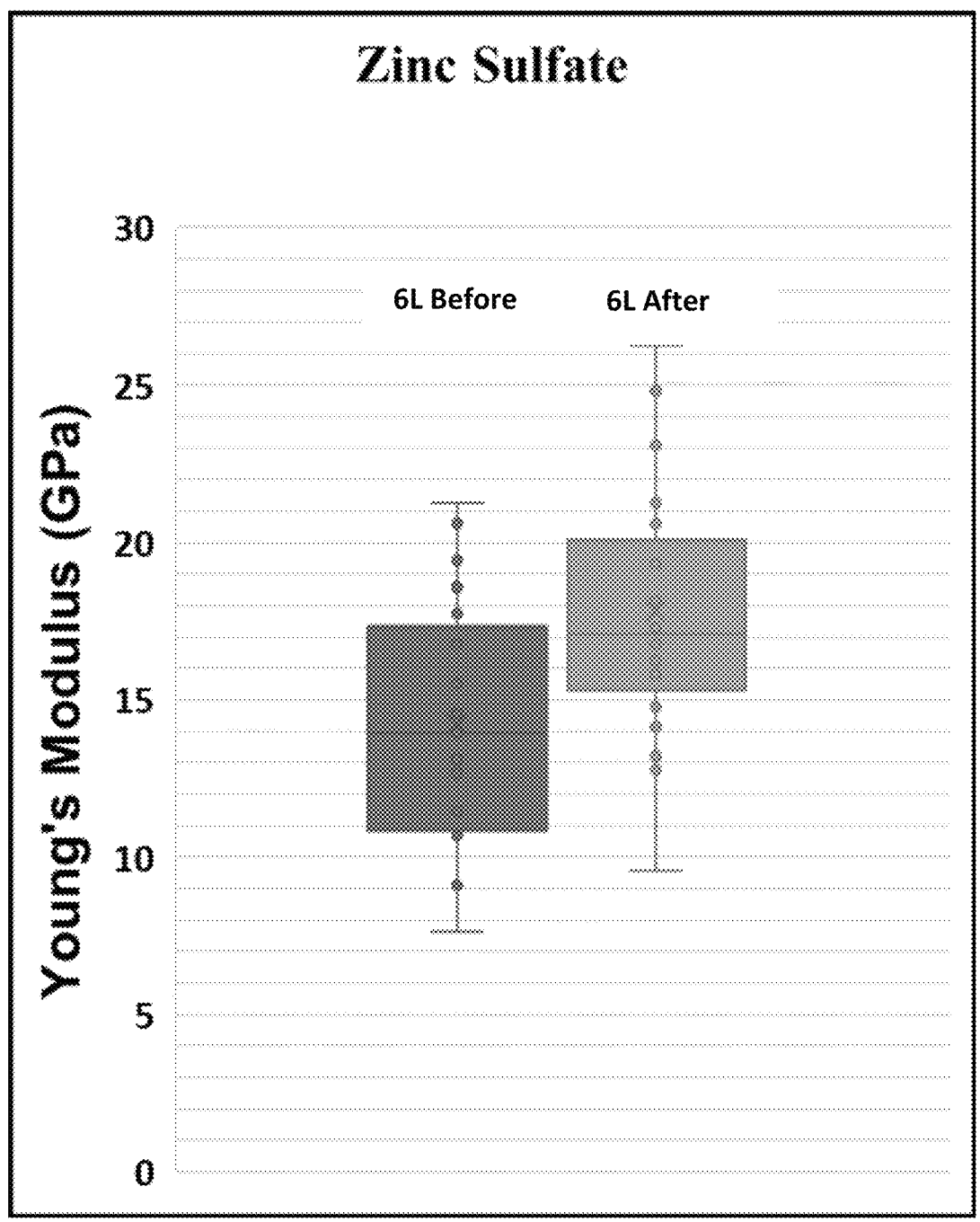
FIG. 4 shows the distribution of 25 points of hardness measurements of a carbonate rock plug (2.5 inches diameter) before and after treatment with zinc sulfate.

The rock hardness was measured at 25 points on the surface of Indiana limestone plug 2.5 inches in diameter which is treated with zinc sulfate solution. The hardness here is assessed through measurements of Young's modulus on the surface. As can be observed from the results in Table 1, the average rock hardness improved from 14.18 GPa to 17.84 GPa, representing roughly 26% improvement in hardness. Also, the weakest point in the rock surface has improved from 7.64 Gpa to 9.57 GPa. The results shown in Table 1 are visualized in FIG. 4. Table 3 shows changes in permeability observed in five rock samples before and after zinc sulfate treatment.

TABLE 1

Statistical parameters of the rock hardness before and after treatment with zinc sulfate.

| Parameter | $ZnSO_4$ Before | After |
|---|---|---|
| Hardness Mean (GPa) | 14.18 | 17.84 |
| Hardness Standard Deviation | 0.8 | 0.8 |
| Hardness Range | 13.62 | 16.68 |
| Minimum Hardness | 7.64 | 9.57 |
| Maximum Hardness | 21.26 | 26.25 |

TABLE 2

Statistical parameters of the rock hardness before and after treatment with TEOS.

| Parameter | TEOS Before | After |
|---|---|---|
| Hardness Mean (GPa) | 14.26 | 16.8 |
| Hardness Standard Deviation | 0.74 | 0.87 |
| Hardness Range | 13.49 | 20.29 |
| Minimum Hardness | 8.41 | 5.19 |
| Maximum Hardness | 21.9 | 25.48 |

TABLE 3

Change in rock permeability before and after zinc sulfate treatment.

| Sample ID | K (mD) Before | K (mD) After | Change, mD | Change, % |
|---|---|---|---|---|
| 1L | 4.66 | 1.79 | −2.88 | −61.67 |
| 1S | 6.45 | 2.23 | −4.22 | −65.47 |
| 2L | 14.57 | 10.55 | −4.01 | −27.54 |
| 2S | 4.62 | 2.26 | −2.36 | −51.08 |
| 3L | 13.47 | 6.27 | −7.20 | −53.47 |

TABLE 4

Change in Young's modulus and rock permeability before and after TEOS treatment.

| Sample ID | Treatment Fluid | Young's (Gpa) Before | Young's (Gpa) After | Change, % | K (mD) Before | K (mD) After | Change, % |
|---|---|---|---|---|---|---|---|
| 5L | TEOS | 17.1 | 18.15 | 6.13 | 11.57 | 13 | 12.35 |
| 5S | TEOS | 10.26 | 12.2 | 18.99 | 6.94 | 10.04 | 44.67 |
| 8L | Raw TEOS | 14.26 | 16.08 | 12.76 | 16.01 | 20.52 | 28.18 |

Figure 5:
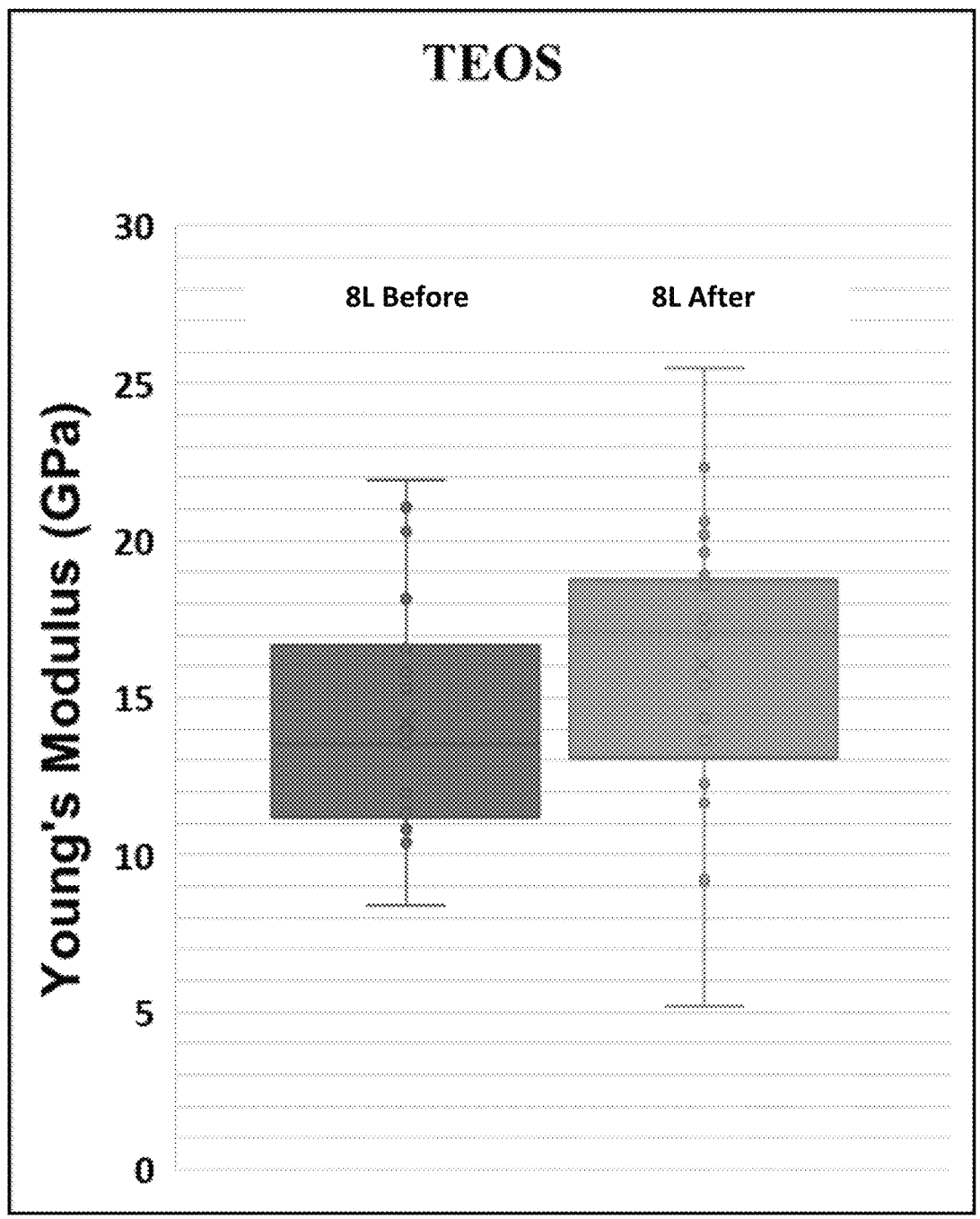
FIG. 5 shows the distribution of 25 points of hardness measurements of a carbonate rock plug (2.5 inches diameter) before and after treatment with raw (undiluted) TEOS.

Results of one of the samples treated with TEOS is summarized in Table 2. The average rock hardness increased from 14.26 GPa to 16.8 GPa, representing roughly 18% improvement in hardness. FIG. 5 illustrates a comparison of hardness measurement before and after treatment with TEOS. Table 4 shows the changes in rock hardness and permeability observed in three samples before and after treatment with TEOS.

The invention claimed is:

1. A method for treating a carbonate rock, comprising: contacting the carbonate rock with an aqueous composition comprising 0.01-1.0 M zinc salt, wherein the contacting is maintained for a time period of 12-72 h, thus forming a treated rock having a hardness determined by Young's modulus that is at least 10% greater than the carbonate rock.

2. The method of claim 1, wherein the carbonate rock is part of a building exterior or part of an outdoor ornamental structure.

3. The method of claim 1, wherein the carbonate rock is within a subterranean carbonate formation.

4. The method of claim 1, wherein the hardness of the treated rock is 20-80% greater than the carbonate rock.

5. The method of claim 1, wherein the zinc salt is at least one selected from the group consisting of $ZnCl_2$, $ZnBr_2$, $ZnI_2$, $ZnF_2$, $ZnCl_2$, $ZnO$, $ZnS$, $ZnSO_4$, $ZnSe$, $Zn(OH)_2$, $Zn(NO_3)_2$, and $Zn_3(PO_4)_2$.

6. The method of claim 1, wherein the zinc salt is at least one selected from the group consisting of $ZnSO_4$, $Zn(OH)_2$, and $Zn_3(PO_4)_2$.

7. The method of claim 1, wherein the zinc salt is $ZnSO_4$.

8. The method of claim 1, wherein the aqueous composition consists of the zinc salt and water.

9. The method of claim 8, wherein the concentration of the zinc salt is 0.30-0.60 M.

10. The method of claim 1, wherein the aqueous composition further comprises a carbonate or a bicarbonate salt.

11. The method of claim 1, wherein the carbonate rock comprises at least 85 wt % calcium carbonate relative to a total weight of the carbonate rock.

12. The method of claim 1, wherein the treated rock comprises $ZnCO_3$.

13. The method of claim 1, wherein the treated rock comprises nanoplatelets.

14. The method of claim 1, wherein the treated rock has a permeability that is decreased by 40-80% relative to a permeability of the carbonate rock.

\* \* \* \* \*